Patented Jan. 21, 1941

2,229,265

UNITED STATES PATENT OFFICE 2,229,265

ROSIN COMPOSITION

Herbert John West, Riverside, Conn., assignor to American Cyanamid Company, New York, N. Y., a corporation of Maine No Drawing. Application February 25, 1939, Serial No. 258,567

9 Claims. (Cl. 260—24)

This invention relates to a modified rosin composition of high softening point for use as a rosin or shellac substitute in the preparation of paints and varnishes. The invention includes various grades of crude or purified rosins modified in accordance therewith, their methods of manufacture, and new and improved compositions containing them.

I have found that all grades of rosin, including rosins purified by solvent methods, are miscible and compatible in all proportions with alkylated aminotriazine-aldehyde condensation products. I have also found that the incorporation of substantial quantities of such aminotriazine-aldehyde condensation products into rosins in the form of a uniform dispersion will materially increase the softening point of the rosin mixture and make it more suitable for use in the manufacture of varnishes.

The broad principles of my invention are not limited to any single aminotriazine-aldehyde condensation product, and any resinophoric material of this class may be used if desired. However, the condensation products of melamine and its derivatives such as 2.4.6 triethyl and triphenyl triamino 1.3.5 triazines, 2.4.6 trihydrazino 1.3.5 triazine and the corresponding condensed triazines such as melam and melem appear at the present time to be of greatest immediate commercial importance, by reason of the availability of melamine and its derivatives from dicyandiamide or cyanuric chloride as raw materials, and for this reason rosins containing these classes of materials in uniform dispersion constitute preferred embodiments of the invention. On the other hand, triazines containing one or two reactive amino groups such as ammeline, ammelide, formoguanamine, 2 amino 1.3.5 triazine and their substitution products as well as nuclear substituted aminotriazines such as 2 chloro 4.6 diamino 1.3.5 triazine, 2 phenyl 4 amino 6 hydroxy 1.3.5 triazine, 6 methyl 2.4 diamino 1.3.5 triazine and the like can be condensed with lower or higher aliphatic, aromatic or heterocyclic aldehydes to produce products capable of improving the properties of rosins, and such condensation products are therefore included in the invention in its broader aspects.

Any of the foregoing aminotriazines, including melamine, substituted melamines and melamine derivatives, can be condensed with any suitable aldehyde of the aliphatic, aromatic or heterocyclic series such as formaldehyde, acetaldehyde, propionaldehyde, butyraldehyde, hexaldehyde, heptaldehyde, crotonaldehyde, allylaldehyde, benzaldehyde, cinnamylaldehyde, furfural and the like to produce condensation products which can be uniformly dispersed in rosins in accordance with the principles of the invention.

The condensation between the aminotriazine and the aldehyde may take place under acid, neutral or alkaline conditions, and in the presence or absence of a solvent for the incompletely polymerized reaction products which are first formed. These condensation products may be prepared by any suitable process and in any desired combining ratio of aldehyde to aminotriazine from 1:1 up to and including 6:1. They may then be alkylated by any desired method, such as by heating with an acidified solution of any suitable alcohol such as methanol, propanol, butanol, cyclohexanol, amyl alcohol or the mixture of isomeric amyl alcohols known commercially as "Pentasol". For example a two-stage process may be used in which the aminotriazine and aldehyde are condensed at a pH of 7 or higher and the resulting condensation product is dispersed in the alcohol at a pH of less than 6, or a one-stage process in which both the initial condensation of the aminotriazine and the aldehyde and the subsequent dispersion in alcohol are carried out at a pH of less than 6.

Alkylated aminotriazine-aldehyde condensation products, which may be prepared as outlined above, are preferably dispersed in the rosin while the latter is in a molten condition. Any desired grade of rosin may be used, including the lighter and darker grades of gum rosin and wood rosin as well as rosins that have been purified by dissolving in solvents such as gasoline and treating with purifying agents such as liquid sulfur dioxide. These rosins are melted and preferably heated to about 100° C., whereupon the alkylated aminotriazine-aldehyde condensation product is added in any suitable ratio and the heating is continued with agitation until a uniform blend of the rosin and condensation product have been obtained.

With most aminotriazine-aldehyde condensation products, and particularly with the melamine-formaldehyde condensation products which form the preferred modifying agents of the present invention, I have found that the mixture of rosin and condensation product is most suitably blended when it is heated slowly to 180–220° C. and maintained within this temperature range for a period of 15–25 minutes. When the condensation product is added to the molten rosin as a solution in a solvent such as an alcohol the solvent usually distills off during the first part of the heating period. Alcohol from the alkylated aminotriazine-aldehyde condensation product itself is also evolved during this period, as well as a certain amount of aldehyde, so that when the upper temperature range of 180–220° C. is reached there is formed a true solution of the condensation product in molten rosin. The heating is continued at these high temperatures until a uniform blend is obtained, after which the mass may be allowed to cool and harden.

The invention will be illustrated in greater detail by the following specific examples. It should be understood, however, that although these examples describe certain of the more specific features of the invention they are given primarily for illustrative purposes, and that the invention in its broader aspects is not limited thereto.

*Example 1*

150 parts of hexamethylol melamine, 300 parts of butanol and 0.75 part of 85% phosphoric acid are stirred together for 30–60 minutes. Heat is then applied and a mixture of butanol and water is distilled off. The butanol is preferably replaced by continuous or intermittent additions of anhydrous butanol and the distillation is continued until all the water is removed.

The resulting solution may be mixed with molten rosin in any desired ratio. For example, 50 parts of gum rosin are melted and heated to 100° C. and 20 parts of the alkylol melamine solution are added. The temperature is slowly raised while formaldehyde and butanol vapors are given off and the mixture is finally held for 15–20 minutes at 180–220° C., and preferably at about 200° C. The resin is then cooled and hardened.

The product is soluble in toluol and has a softening point of 105° C. It is well suited for use in the formulation of nitrocellulose lacquers for wood finishing.

*Example 2*

183 parts by weight of 37% formaldehyde solution are adjusted with sodium hydroxide to a pH of 7.5. 63 parts of melamine are added and the mixture is heated to boiling in a vessel equipped with a stirrer and reflux condenser. After refluxing with agitation for about one hour 320 parts of n-butanol acidified with 1 part of 85% phosphoric acid are slowly added.

The solution is refluxed for about one hour longer after which the mixture is dehydrated by distilling off a butanol-water mixture. The distillation is continued with addition of further amounts of butanol until the solution is substantially anhydrous.

100 parts of this solution were adjusted to 50% solids content and mixed with 100 parts of rosin as in Example 1. The mixture was held at 180–200° C. for 20–25 minutes and then allowed to cool and harden. The resulting resin is a shellac substitute, and can be cooked with blown or kettle-bodied linseed, soya bean or tung oils for the manufacture of varnishes. For example, when 100 pounds of the resin are cooked with 12–15 gallons of linseed oil and suitable amounts of driers and thinners are added, a good furniture varnish is obtained.

*Example 3*

110 parts of 2.4 diamino 1.3.5 triazine are heated with 243 parts of 37% formaldehyde solution for about 4 hours, or until a clear solution is obtained. 400 parts of cyclohexanol containing 1 part of 85% phosphoric acid are added and the mixture is boiled until all its water content has been removed. Additional cyclohexanol is added during this dehydration so that at the end a solution of 50% solids content is obtained.

100 parts of rosin are melted and 50 parts of the above solution are added. The mixture is slowly heated with evolution of formaldehyde and cyclohexanol vapors and held at 200° C. for 20 minutes. The resulting resin is well suited for use in the manufacture of printing inks.

What I claim is:

1. A composition comprising the uniform blend of rosin and aminotriazine-aldehyde resin obtained by heating rosin at 180–220° C. with the material obtained upon reacting an initial aminotriazine-aldehyde condensation product with an alcohol.

2. A composition comprising the uniform blend of rosin and melamine-aldehyde resin obtained by heating rosin at 180–220° C. with the material obtained upon reacting an initial melamine-aldehyde condensation product with an alcohol.

3. A high softening point rosin consisting essentially of a major proportion of rosin and a minor proportion of aminotriazine-aldehyde resin uniformly dispersed therein by heating the rosin at 180–220° C. with the material obtained upon reacting an initial aminotriazine-aldehyde condensation product with an alcohol.

4. A high softening point rosin consisting essentially of a major proportion of rosin and a minor proportion of melamine-aldehyde resin uniformly dispersed therein by heating the rosin at 180–220° C. with the material obtained upon reacting an initial melamine-aldehyde condensation product with an alcohol.

5. A method of producing a modified rosin of high softening point which comprises mixing molten rosin with the material obtained upon reacting hexamethylol melamine with an alcohol and heating the mixture at 180–220° C. until a uniform blend is obtained.

6. A method of producing a modified rosin of high softening point which comprises mixing molten rosin with the material obtained upon reacting an alkylol melamine with an alcohol and heating the mixture at 180–220° C. until a uniform blend is obtained.

7. A method of producing a modified rosin of high softening point which comprises mixing molten rosin with the material obtained upon reacting an alkylol melamine with butyl alcohol and heating the mixture at 180–220° C. until a uniform blend is obtained.

8. A high softening point rosin consisting essentially of a uniform blend of about 75–65 parts of rosin and about 25–35 parts of aminotriazine-aldehyde resin, obtained by mixing the rosin in molten condition with the material obtained upon reacting an initial aminotriazine-aldehyde condensation product with an alcohol and heating the mixture at 180–220° C. until a uniform blend is obtained.

9. A high softening point rosin consisting essentially of a uniform blend of about 75–65 parts of rosin and about 25–35 parts of melamine-aldehyde resin, obtained by mixing the rosin in molten condition with the material obtained upon reacting an alkylol melamine with an alcohol and heating the mixture at 180–220° C. until a uniform blend is obtained.

HERBERT J. WEST.